Jan. 1, 1929.  1,696,985
N. TRBOJEVICH
HYDRAULIC BRAKE
Filed Nov. 8, 1926  3 Sheets-Sheet 1
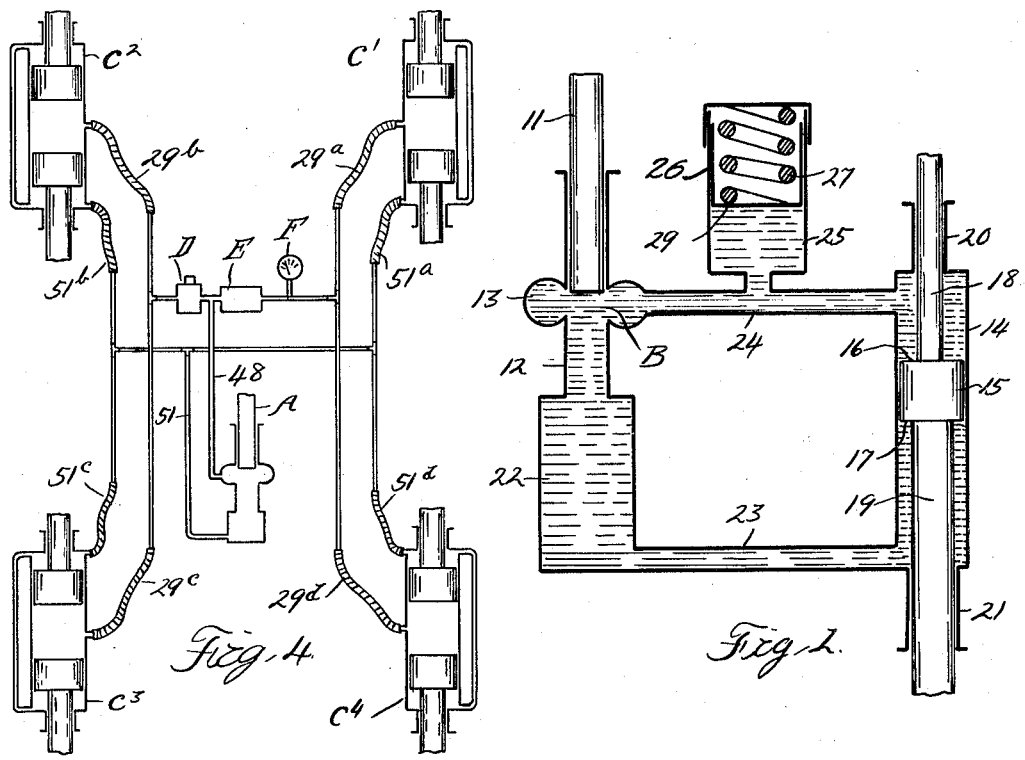
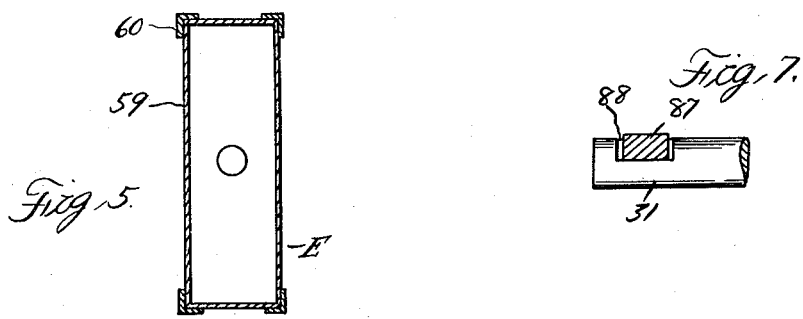
Inventor
Nikola Trbojevich
By Whittemore Hulbert Whittemore
 Belknap
Attorneys

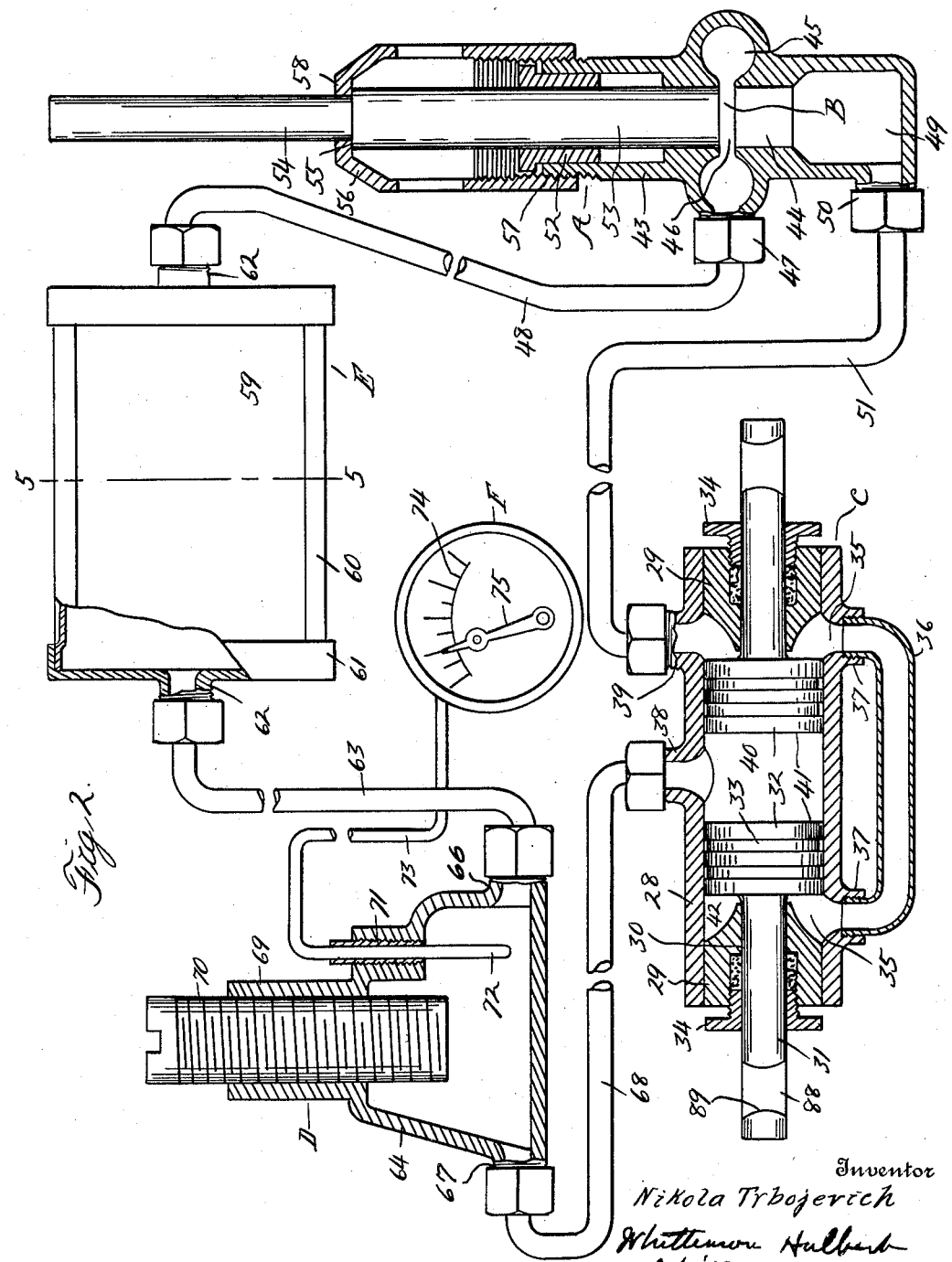

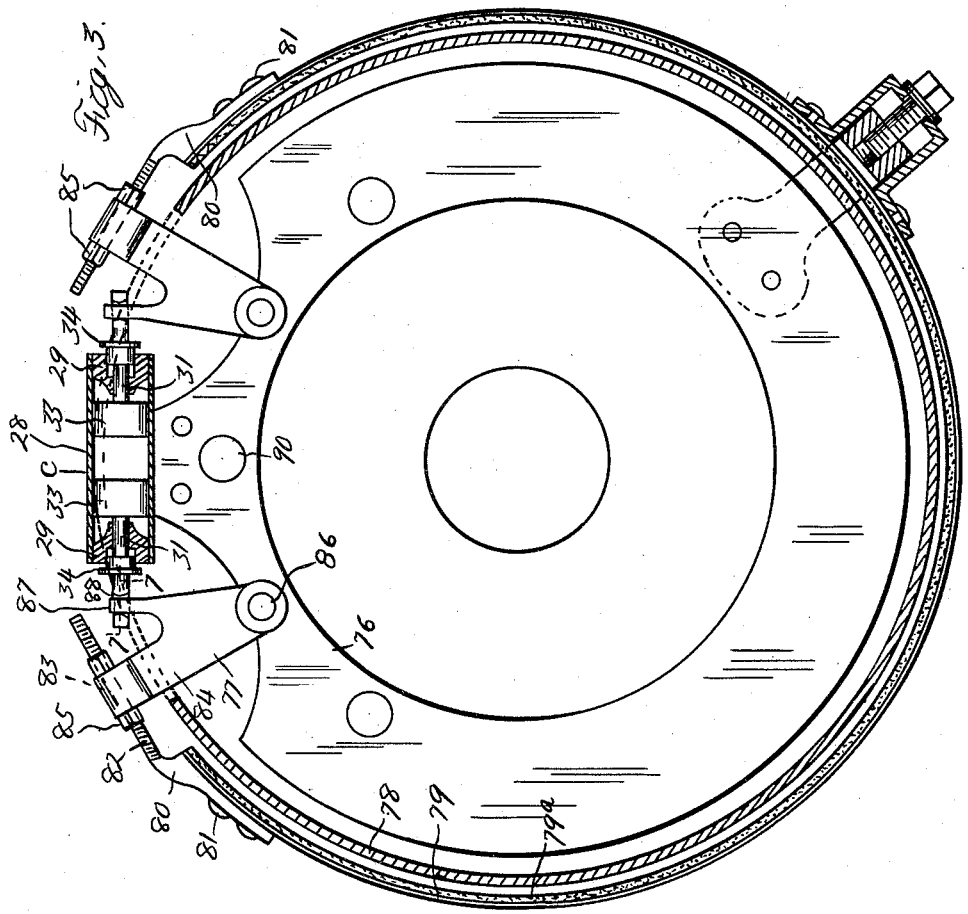
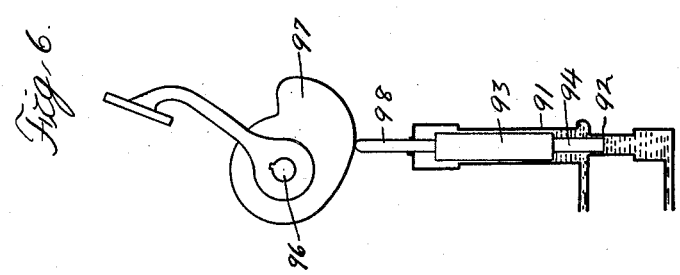

Patented Jan. 1, 1929.

1,696,985

UNITED STATES PATENT OFFICE.

NIKOLA TRBOJEVICH, OF HIGHLAND PARK, MICHIGAN.

HYDRAULIC BRAKE.

Application filed November 8, 1926. Serial No. 147,155.

The invention relates to a hydraulic system for controlling the motion of various mechanisms from a remote point. While in its broader aspects the invention may be advantageously applied to various types of mechanical devices, the embodiment specifically referred to in this application is a hydraulic brake system for self-propelled vehicles.

My improved braking system makes use of a novel fluid circuit by means of which it is possible to render wheel brakes more powerful, quicker acting and more reliable than heretofore. The particular advantage connected with this system is that the circuit is fully self-compensating for fluid losses internal or external, for the variations of volume due to the changes in temperature and for the increased clearance of the brake bands mostly due to wear. Another advantage is that the brakes are not only tightened, but also released by positive fluid pressure, thus doing away with the brake springs. This feature renders it plausible to employ all metal brakes on automobiles. A further advantage is that the entire circuit is at all times filled with high pressure liquid, thereby positively preventing the entrance of air bubbles into the conduits and also preventing what is sometimes termed "soft pedal" action, which is a considerable source of danger in the operation of a motor vehicle. Another advantage resides in the fact that the brake band clearance may automatically be kept constant during the life of the brake linings.

Referring to the drawings:—

Figure 1 is a diagrammatic representation of the improved fluid system;

Figure 2 shows sectional views of the various mechanisms connected together to form the fluid system;

Figure 3 is a section through a wheel brake mechanism operable by the improved fluid pressure system;

Figure 4 is a diagrammatic representation of a fluid system adapted to simultaneously actuate four-wheel brakes of a motor vehicle;

Figure 5 is a section on line 5—5 of Fig. 2;

Figure 6 is a longitudinal section through a modified plunger operating mechanism;

Figure 7 is a fragmentary section on the line 7—7 of Fig. 3.

Referring now to the novel fluid system as diagrammatically illustrated in Figure 1, 11 represents the actuating plunger movable in the cylinder 12. This cylinder is provided with an enlarged annular portion 13 intermediate its ends forming what has been termed the "equalizing" gap B. 14 is a work cylinder in which the piston 15 is slidable, said piston having its upper surface 16 of greater effective cross sectional area than the lower surface 17. The piston 15 has rods 18 and 19 extending from the opposite ends thereof through the stuffing boxes 20 and 21 respectively. The rod 18 is of smaller cross section than the rod 19, thus providing for the differential effective areas on the opposite sides of said piston. The cylinder 12 communicates with an enlargement 22 and from thence through a pressure conduit 23 to the lower end of the cylinder 14. The cylinder 12 is also connected with the upper end of the cylinder 14 by means of a release conduit 24, which communicates with the cylinder 12 through the equalizing gap B. 25 is a fluid reservoir communicating with the release conduit 24 and being provided with a resiliently displaceable member 26, which as shown comprises a piston slidable in the reservoir 25 and a spring 27 for opposing the upward movement of the piston. It is to be understood that the piston 15 through the rods 18 and 19 is connected to the mechanism which is to be operated by the fluid system, while the plunger 11 extends to the actuating mechanism, such as a pedal or other source of power.

In the operation of the fluid system it will be observed that when the plunger 11 is moved downwardly in the cylinder 12, a displacement of the fluid takes place and pressure is transmitted through the pressure conduit 23 to the lower surface 17 of the piston 15, while pressure is also transmitted through equalizing gap B and release conduit 24 to the upper surface 16 of said piston. Since the fluid in the system is incompressible, the movement of the plunger across the equalizing gap B causes a displacement of the piston 26 in reservoir 25, thus increasing the pressure on the system due to the compression of the spring 27. The pressure on the fluid in the entire system is the same throughout all of the conduits, but due to the different effective areas of the surfaces 16 and 17 of piston 15, the latter will be displaced downwardly to the bottom of its stroke. When the plunger 11 is advanced sufficiently to close the equalizing gap B, the pressure in the pressure conduit 23 is greatly increased, but this pressure can no longer be transmitted to the release conduit 24 through the equalizing gap B, and therefore as soon as the pressure is built up to such a point as to overcome the lower pressure acting on the larger surface 16, the piston 15 will be moved upwardly in the cylinder 14 by positive fluid pressure. Whatever displacement occurs by reason of the upward movement of piston 15 will cause the excess fluid to accumulate in the reservoir 25 and further increase the pressure in the release conduit 24. When the plunger 11 is withdrawn from the cylinder 12, the pressure in the pressure conduit 23 is again reduced, thus causing a lowering of the piston 15 and when the plunger 11 again uncovers the equalizing gap B, the conduits 23 and 24 are again placed in communication so that the same pressure obtains throughout the entire system and the piston 15 is moved downwardly by the differential effective pressure on its upper and lower surfaces.

In Figure 2 I have shown more in detail the parts of the apparatus forming the fluid system. A represents the operating plunger mechanism, C a fluid motor for actuating the wheel brakes or other mechanism to be operated, D the fluid supply and pressure regulator, E the spring box, and F a pressure gauge. The fluid motor C may be constructed in various ways in order to carry out the principle illustrated diagrammatically in Figure 1, but as shown this motor is of the double acting differential type; that is, it contains two differential pistons which are simultaneously actuated. In detail, the motor comprises a cylinder 28 having head members 29 at its opposite ends, each of which has a central bearing 30 for slidably receiving the piston rod 31. At the inner end of each piston rod is a piston 32 provided in the conventional manner with packing rings 33. 34 represents a stuffing gland adapted to maintain a fluid tight joint with the piston rod. The heads 29 are preferably so formed as to provide between the same and the outer cylinder 28 the annular spaces 35 which are connected together by a conduit 36 having its opposite ends secured to the nipples 37 projecting from the cylinder. The motive fluid is conducted into the cylinder through the nipple connections 38 and 39, the former being located at the central point of the cylinder to communicate with the space 40 between the pistons and the latter being connected to one of the annular spaces 35. It will be noted that the adjacent faces 41 of the pistons 32 are of larger effective area than the outer faces 42, the latter being less in area by the amount of the cross sectional area of the piston rods 31.

The operating plunger mechanism A comprises a housing 43 provided with a cylinder bore 44 and an annular space 45 surrounding the cylinder bore and communicating therewith through port 46 forming an equalizing gap B. The annular space 45 is connected by means of a nipple 47 to the return fluid conduit 48 which leads to the spring box E. The housing 43 is also provided with an enlarged chamber 49 communicating at one end with the cylinder bore 44 and at the other end with a nipple 50 for attachment to the pressure conduit 51. This conduit leads to the inlet port of the fluid motor indicated at 39. The upper end of the housing 43 is provided with a packing gland 52 for maintaining a fluid tight seal with the movable plunger 53, the latter having its inner end of a diameter to closely fit the cylinder bore 44. The plunger 53 is provided with a portion 54 of reduced diameter forming an annular shoulder 55, the purpose of which is to regulate the upward travel of the plunger by contacting with an adjustable stop 56. As shown this stop consists of a shell threadedly secured to the housing 43 at 57 to provide means for longitudinally adjusting the same. The shell has the inwardly extending annular flange 58 which contacts with the shoulder 55. It will be observed that by threadedly adjusting the shell 56 the maximum upward travel of the plunger 53 may be adjusted as desired so that its lower end will determine the width of the equalizing gap B. It is desirable to have the width of this gap as small as the operating conditions will permit, the width being chiefly dependent upon the viscosity of the fluid employed and upon the speed of operation.

The function of the spring box E is to provide means for taking up the displaced fluid in the system and to maintain a resilient resistance on the fluid in the return conduit 48. The apparatus may be constructed in any suitable manner to provide these functions, but as shown it comprises a rectangular box formed of thin elastic side walls 59 reinforced at the corners by angle bars 60. The box has rigid caps or end pieces 61, each provided with a nipple connection 62 for connecting the apparatus into the system. The sides of the spring box must be sufficiently elastic to provide for the maximum displacement in the system and also to maintain the desired tension upon the fluid in the return conduit. With the apparatus as described an increased pressure will deform the flexible sides by bulging the same in an outward direction. One of the nipples 62 is connected to the conduit 48, while the other nipple is connected to the conduit 48, while the other nipple is connected to a conduit 63 leading to a fluid supply and pressure regulator D.

The regulator as shown comprises a hollow shell 64 forming a reservoir 65 of suitable dimensions. The reservoir has two fluid connections 66 and 67, the former being attached to the conduit 63 and the latter connected by a conduit 68 to the nipple 38 on the fluid motor C. The shell 64 is provided with a threaded boss 69 for receiving an adjusting screw 70, the latter projecting into the reservoir 65. By adjusting the screw 70 the initial pressure on the system may be regulated to the desired amount, this pressure being transmitted through the spring box E to the return conduit 48 and through the equalizing gap B to the pressure conduit 51. The shell 64 is also provided with a bushing 71 for receiving a manometer bulb 72 from which pressure is transmitted through a conduit 73 to the manometer or pressure gauge F of any suitable construction. The gauge is provided as usual with an indicating scale 74 and a pressure operated pointer 75. The manometer is not essential to the fluid system, but is preferably provided in order to indicate at all times the pressure which is operative on the system.

With the apparatus illustrated in Figure 2, it will be apparent that I have provided a series of different mechanical units operatively connected into a fluid system, but it is to be understood that it is not essential that these units each be constructed separately, for in some instances some of the parts might be combined into a single unit. The system operates in the same manner as set forth in connection with Figure 1; that is, pressure on the plunger 54, which is derived from a pedal or other suitable source, is distributed uniformly throughout the system, while the lower end of the plunger 53 is in position to maintain the equalizing gap B open. Under these conditions the fluid pressure is transmitted through the pressure conduit 51 to the annular spaces 35 and acts on the outer surfaces 42 of the pistons. Pressure is also transmitted through return conduit 48, spring box E, pressure regulator D and the conduit 68 to the chamber 40 where the pressure acts on the inner faces 41 of the pistons. Thus, due to the differential area between the surfaces 41 and 42 of the pistons and the existing initial pressure on the system, the latter will be normally moved apart. Whenever the plunger 53 is moved downwardly to such an extent as to close the equalizing gap B, the pressure then begins to build up in the pressure conduit 51 at a greater rate than in the return conduit 48 and the pistons are thereupon moved toward each other.

Figure 3 illustrates a portion of a wheel brake mechanism provided with the fluid motor C, previously described. The cylinder 28 of this mechanism is rigidly mounted on a stationary member 76, to which are also attached the operating levers 77 of the brake mechanism. 78 represents the revoluble brake drum, 79 a brake band surrounding the drum and 79ª the brake lining. The inner ends of the brake band are connected to adjusting shoes 80 by means of rivets 81 and the shoes have threaded extensions 82 projecting therefrom through an aperture 83 in the arm 84 of the lever 77. Adjusting nuts 85 are provided on the threaded extension arranged on opposite sides of the arm 84 to provide means for adjusting the brake band relative to the lever. The lever 77 is pivoted to the fixed member 76 by means of a pivotal rod 86 and is provided with a second arm 87 adapted to engage in a recess 88 in one of the piston rods 31 of the fluid motor. The recess is so constructed as to form curved abutment surfaces 89 on the rod 31 spaced in such a manner as to prevent lost motion between the same and the arm 87. Each of the free ends of the brake band is connected to a piston rod 31 so that upon the operation of the fluid motor to move the pistons toward each other, the pressure is transmitted to both ends of the brake band. In mounting the lever 77 on the fixed member 76 it is important that the center of the pivot rod 86 is so arranged that the outer ends of the arm 84 will move in a path that is tangential to the brake band 79. The fixed member 76 is bolted to the wheel axle (not shown) by bolts extending through the circumferentially spaced apertures 90.

Figure 4 represents diagrammatically a hydraulic system for simultaneously actuating brakes on the four wheels of a motor vehicle. In this case there are four fluid motors C' C² C³ and C⁴, all constructed identically, and the plunger operating mechanism A, fluid regulator D, spring box E and manometer F are similar to the units previously described. The pressure conduit 51, instead of being connected to a single fluid motor, is extended to corresponding parts of each of the fluid motors by conduits 51ª 51ᵇ 51ᶜ and 51ᵈ. Similarly the pressure release conduit 48 leads to the spring box E and regulator D and is again divided and extends to each of the fluid motors by conduits 29ª 29ᵇ 29ᶜ and 29ᵈ. It is immaterial whether the parts connected by these conduits are arranged in series or in multiple. It will be observed that all four fluid motors are automatically equalized through units which are common to all— that is, only one operating plunger and equalizing gap are employed and similarly only one spring box and reservoir. It will be understood, of course, that where the fluid motors are mounted on movable parts, such as the steering wheels of the vehicle, it is necessary to provide flexible conduits leading thereto and the same construction is advantageously employed even where the motors are mounted on a non-movable axle housing.

In considering the practical operation of the hydraulic system as applied to vehicle brakes, it may be well to consider the relationship of the forces generated in the system. In Figure 1 if the area of the piston rod 18, piston 15 and piston rod 19 be designated as $A^2$ $A'$ and $A^3$ respectively, then the effective area of the piston 15 on its upper side is equal to $A'-A^2$ and on its lower side to $A'-A^3$, the difference between the two being $A^3-A^2$. When the plunger 11 is in a position to open the equalizing gap B, the pressure in the entire system will be the same, having a value $p_0$ equal to the initial pressure on the system. The piston 15 will thus be moved downwardly behind a propelling force $y$ according to the following equation:—

$$y = (A_3 - A_2) p_0 \quad (1)$$

After the equalizing gap B is closed, the pressure in the release conduit 24 will remain substantially the same or slightly greater (as the initial pressure will be slightly increased due to the displacement in the system), while the pressure in the conduit 23 will greatly increase to a quantity designated by $p$. The upwardly acting force upon the piston 15 denoted by the letter $x$ will then be $$x = (A_1 - A_3) p - (A_1 - A_2) p_0 \quad (2)$$

and the piston will be moved upwardly until it meets with the resistance equal to the force $x$.

If the plunger 11 is released, the pressure $p$ will suddenly disappear and the piston will then be moved downwardly under the influence of a force $z$. This force may be calculated from Equation 2 by substituting therein $p=o$, which gives Equation 3:

$$z = (A_1 - A_2) p_0 \quad (3)$$

It is to be noted that this force $z$ is greater than the force $y$ and the effect of this will be that on the release of the plunger 11 the piston 15 will be withdrawn with a great initial force, which gradually becomes less as the plunger approaches the equalizing gap B.

The action of the hydraulic system will perhaps be better understood by referring to a numerical example. Suppose that the diameters of the piston 32 and the piston rod 31 (Fig. 2) are .978 and .399 inches respectively, which gives their areas as three-quarters of a square inch and one-eighth of a square inch respectively, then the effective area of the piston on the pressure side 42 will be five-eighths of a square inch, and if the piston be subjected to an equal pressure of 200 pounds per square inch on its opposite sides, the piston will be pushed outward with a force of 25 pounds. However, if the pressure on the face 42 is suddenly discontinued (as when pushing the plunger 53 past the equalizing gap B and then discontinuing the pressure), the releasing force will be ¾ × 200 or 150 pounds. Thus it will be apparent that the releasing force is 600% greater at the moment immediately following the braking than after the mechanism was brought into its normal state with the pressure equalized on both sides (that is, when the pressure is equalized through the gap B).

To continue the calculation further, when the pressure on the surface 42 rises to 240 pounds per square inch, the piston will just be balanced and when it rises to 1000 pounds, the pull upon the brake band will be 475 pounds. Thus it is evident that after the release force has once been overcome, any further pressure upon the operating plunger 53 is transmitted to the brake bands in full—that is, without loss, in spite of the differential action of the work piston.

Another feature of the hydraulic brake system is that the brake band clearance may be equalized in all of the brake mechanisms. This may be accomplished by constructing the brake band 79 of a resilient material, such as tempered steel, with a lining of the usual friction material $79^a$. The band is so constructed that it is normally of smaller diameter than the brake drum 78 and to provide clearance must be held outward by the fluid pressure in the system. With such a construction it will be apparent that the amount of brake band clearance may be adjusted by regulating the initial pressure in the system by means of the adjusting screw 70. The force counteracting the resilient brake band is due to the initial pressure on the system acting through the differential areas on the piston. Since these areas may be made of any desired differential, it is obvious that the required force can easily be selected while still maintaining the desired initial pressure on the system to insure absence of air bubbles in the system. When the brake band clearance is once adjusted by means of the adjusting screw 70, this clearance will be maintained constant during the life of the brake linings.

As previously mentioned, it is desirable to employ a manometer or pressure gauge in connection with the system. The dial 74 may be calibrated to show the pressure in pounds per square inch or it may be calibrated to show the clearance of the brake bands in thousandths of an inch.

When the brakes are released, the manometer F should show the release pressure $p_0$ of the system. Suppose that a pressure of 200 pounds per square inch is desired and the manometer shows 150 pounds, the pressure can then be brought to the desired amount by manipulation of the adjusting screw 70. When the brakes are tightened, a small amount of liquid will be forced to the spring box E and the pressure in the release circuit will increase. It is to be noted that the amount of liquid thus forced in is proportional to the length of the stroke of the piston 32 and the length of stroke is proportional to the clearance of the brake bands. On the other hand, the increase of pressure as read on the dial of the manometer is proportional to or a function of the quantity of liquid forced in. Therefore the increase of release pressure is a function of band clearance and of total or composite band clearance in case several brakes are connected to the same release circuit.

Another function of the manometer is to indicate the presence of air bubbles or pockets in the pressure conduit. According to the theory of the system, the pressure conduit 51 contains in an incompressible medium which cannot become elastic unless there are air bubbles present in the fluid. Thus while the plunger 53 is being pushed down, the pressure in the manometer should constantly rise even where there is an internal leakage past the plunger 53 or the pistons 32. Therefore if it is possible to push the plunger without increasing the reading on the dial 74, that fact should indicate the presence of air bubbles or air pockets in the pressure conduit.

In Figure 6 I have shown a slightly modified form of plunger operating mechanism in which the housing is provided with a cylinder bore 91 above the equalizing gap 13 and a smaller cylinder bore 92 below said gap. The operating plunger 93 slides in the bore 91 and contains a projecting portion 94 for engaging the bore 92. The object of this modification is to subject the plunger 93 at all times to the pressure in the release circuit so that the plunger will be immediately returned as soon as the actuating force on the same is discontinued.

In Figure 6 I have also illustrated a method for operating the plunger 93 by means of a pedal. In this arrangement the pedal is mounted on a shaft 96 and is secured to a cam 97, which in turn engages a cam follower 98 on the upper end of the plunger 93. The cam 97 may be so designed that the plunger may be advanced in any desired relationship to the oscillating motion of the pedal. Thus, for example, the contour of the cam may be selected so that the brakes will be applied gently upon the first half of the pedal stroke and will be applied with much greater force in the second half of the stroke.

What I claim as my invention is:

1. In a hydraulically operated mechanism, the combination of a cylinder, a work piston therein having different effective areas on opposite sides thereof, a pressure conduit connected to said cylinder on one side of said piston, an auxiliary conduit connected to said cylinder on the other side of said piston, resiliently displaceable means in said auxiliary conduit, and means permitting communication of said auxiliary conduit with said pressure conduit upon the release of pressure in the latter.

2. In a hydraulically operated mechanism, the combination of a cylinder, a work piston therein having different effective areas on opposite sides thereof, a pressure conduit connected to said cylinder on the side of said piston having the smaller effective area, an auxiliary conduit connected to said cylinder on the side of said piston having the larger effective area, resiliently displaceable means in said auxiliary conduit, and means permitting communication of said auxiliary conduit with said pressure conduit when the pressure in the latter falls below a predetermined value.

3. In a hydraulically operated mechanism, the combination of a work cylinder, a work piston reciprocable therein provided with different effective areas on opposite sides thereof, a displacement cylinder, a plunger movable in the same, a pair of branch conduits leading from said work cylinder on opposite sides of said work piston and connected to said displacement cylinder, resiliently displaceable means in one of said branch conduits, said last mentioned conduit being connected to said displacement cylinder in such a manner as to be alternatively in and out of communication therewith according to whether said plunger is retracted or advanced in said cylinder.

4. In a hydraulically operated mechanism, the combination of a cylinder, a differential work piston therein, a fluid pressure conduit connected to said cylinder on one side of said piston, a second conduit connected to the cylinder on the opposite side of said piston, resiliently displaceable means connected to said second conduit, means for initially applying fluid pressure to both of said conduits, whereby the differential action of said piston causes movement of the same in one direction, and means operable after a predetermined initial movement to cut off the pressure on said second conduit whereby further applied pressure causes movement of said piston in the reverse direction.

5. In a hydraulically operated mechanism, a work cylinder, a pressure conduit, a release conduit, all normally connected together to form a closed fluid circuit, resiliently displaceable means connected to said release conduit, a differential piston in said work cylinder, means for placing said circuit under initial positive pressure, and means for cutting off communication between the release and pressure conduits and simultaneously increasing the pressure in said pressure conduit.

6. In a hydraulic braking system, the combination with a brake drum and a brake shoe, of a cylinder, a differential piston in said cylinder connected to said brake shoe, and having different effective areas on opposite sides thereof, a pressure conduit connected to said cylinder on the side of said piston having the smaller effective area, a release conduit connected to said cylinder on the side of the piston having the larger effective area, means for applying equal pressure to both conduits whereby said brake shoe is positively released by fluid pressure due to the differential action of said piston, and means for applying greater pressure to the smaller area whereby said brake shoe is positively set by fluid pressure.

7. In a hydraulic braking system, the combination with a plurality of brake mechanisms, of a differential piston operably connected to each brake mechanism, a cylinder for each piston, a common pressure conduit having branches leading to each of said cylinders, a common release conduit having branches leading to each of said cylinders on the opposite side of the pistons from said pressure conduits, resiliently displaceable means in said release conduit, means for applying pressure to said common pressure conduit to set all of said brakes, and means for normally interconnecting said pressure and release conduits to release said brakes and equalize the same.

In testimony whereof I affix my signature.

NIKOLA TRBOJEVICH.